April 6, 1965  W. A. WATHEN  3,176,829
BALE THROWING MECHANISM WITH AUGERS
Filed Feb. 10, 1961  4 Sheets-Sheet 3

INVENTOR.
WILLIAM A. WATHEN
BY
ATTORNEYS.

April 6, 1965   W. A. WATHEN   3,176,829
BALE THROWING MECHANISM WITH AUGERS
Filed Feb. 10, 1961   4 Sheets-Sheet 4

INVENTOR.
WILLIAM A. WATHEN
BY
Wolf, Hubbard, Voit & Osann
ATTORNEYS.

United States Patent Office 3,176,829
Patented Apr. 6, 1965

3,176,829
BALE THROWING MECHANISM WITH AUGERS
William A. Wathen, Detroit, Mich., assignor to Massey-Ferguson Inc., Detroit, Mich., a corporation of Maryland
Filed Feb. 10, 1961, Ser. No. 88,397
3 Claims. (Cl. 198—128)

This invention relates to projectors for projecting solid objects through the air and is particularly designed for use in receiving bales of hay, straw or the like, from a hay baler and projecting them rapidly through the air into a receiving wagon, but which is equally well adapted for receiving bales from any other source and projecting them into any other storage area, such as a hay mow.

Bale throwers for use behind hay balers are known and these customarily provide opposed rubber belts or rollers which form a nip between which a bale may be inserted to be accelerated and projected out of the opposite end of the nip. The belts or rollers are driven at a constant high velocity usually by a light gasoline engine mounted on the thrower.

When such a thrower is used behind a conventional baler, there is a wide difference between the speed at which the bale is extruded from the baler and the speed of the belts or rollers which frictionally engage the sides of the bale. Inasmuch as all balers extrude their bales in small steps of an inch or two, it is difficult to assure sufficient projection of the bale into the nip to assure that it will be accelerated. Since it is inevitable that the difference in speeds between the bale and the belts or rollers is accommodated during acceleration by slippage, it is inevitable that the sides of the bale are chewed away to some extent at the entering end. It frequently requires several successive extrusion steps of a bale before sufficient length thereof is engaged in the nip to cause its acceleration through the throwing mechanism to begin.

Bale throwing mechanisms which use belts or rollers for frictional contact with the bale sides require three or more opposed pairs of rollers, each of which have bearings which must be sealed against dust. In addition they require the use of rubber or similar non-metallic material which does not weather well and is subject to more rapid wear than metal parts.

It is an object of the present invention to provide an improved bale projecting apparatus which will avoid the use of rubber or other non-metallic friction elements and provide a simpler construction with fewer bearings than those previously available.

A further object is to provide an improved combination of hay baler and bale projector in which means is provided for instantly increasing the length of frictional engagement with the side of the bale at the time of initial insertion into the projector beyond that obtainable from a single normal extrusion step of the bale from the baler.

Other objects and advantages of the invention will become apparent upon reading the attached detailed description and upon reference to the drawings in which.

Figure 1:
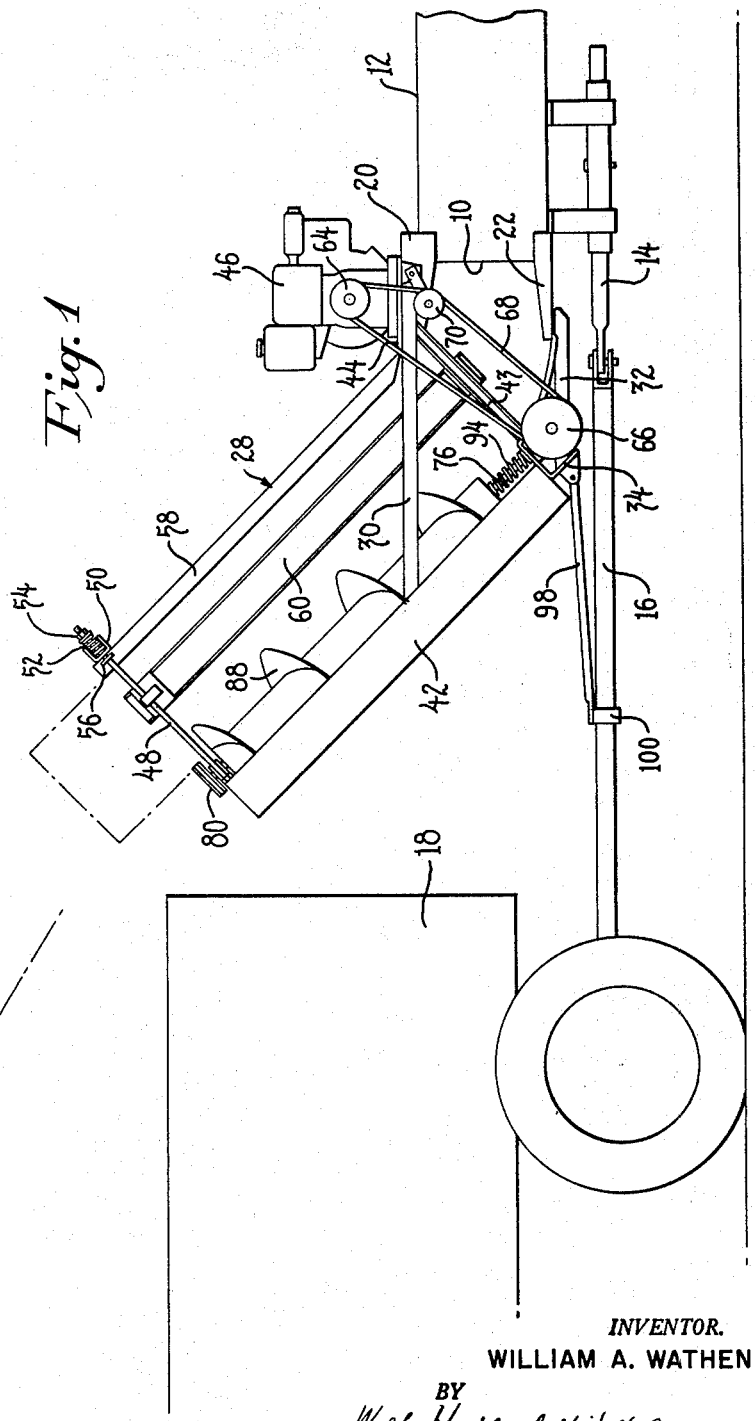
FIGURE 1 is a side view of a bale projecting mechanism and associated baler and wagon incorporating a preferred form of the present invention.
Figure 2:
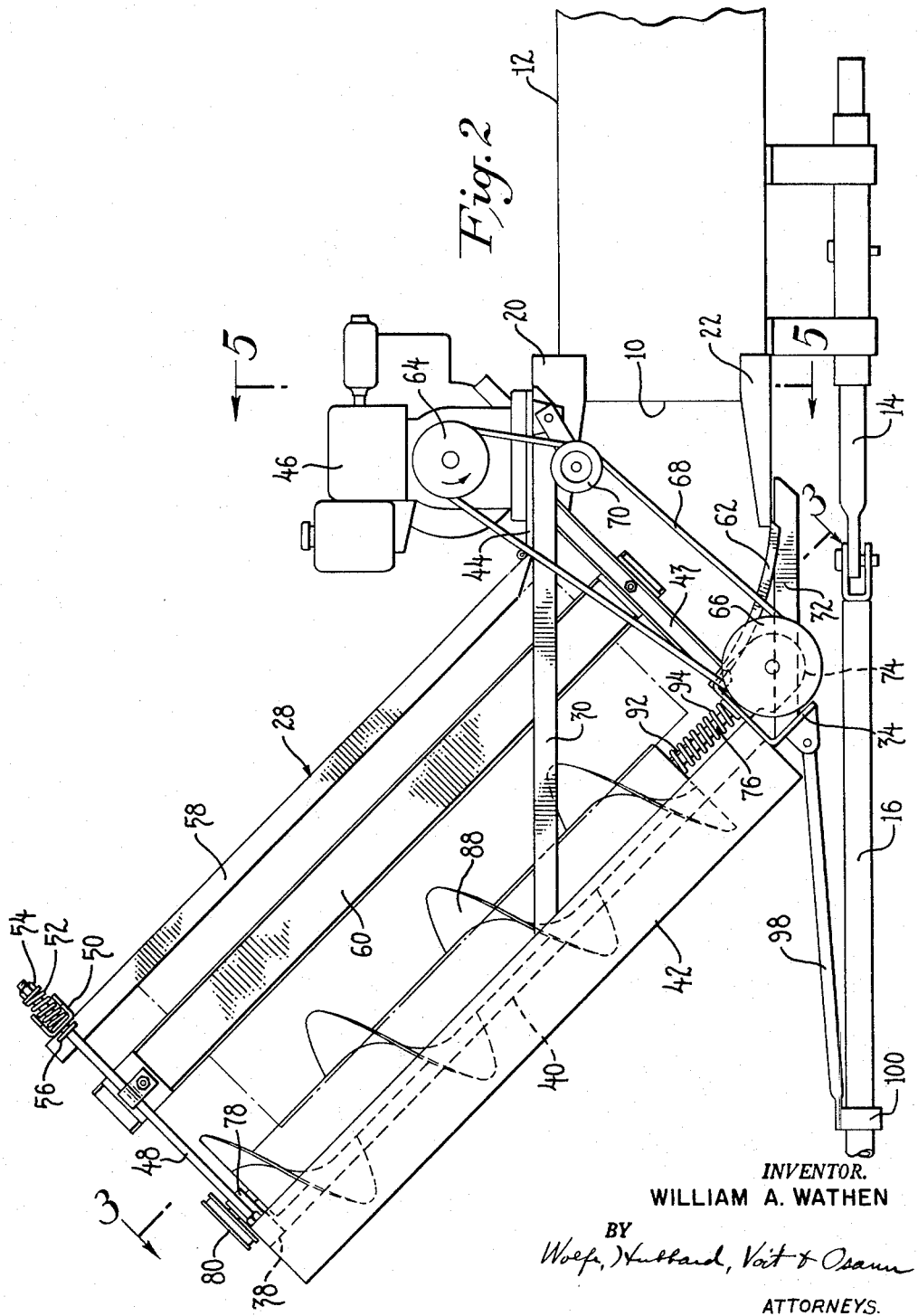
FIGURE 2 is an enlarged view of the projector corresponding to a portion of FIGURE 1.
Figure 3:
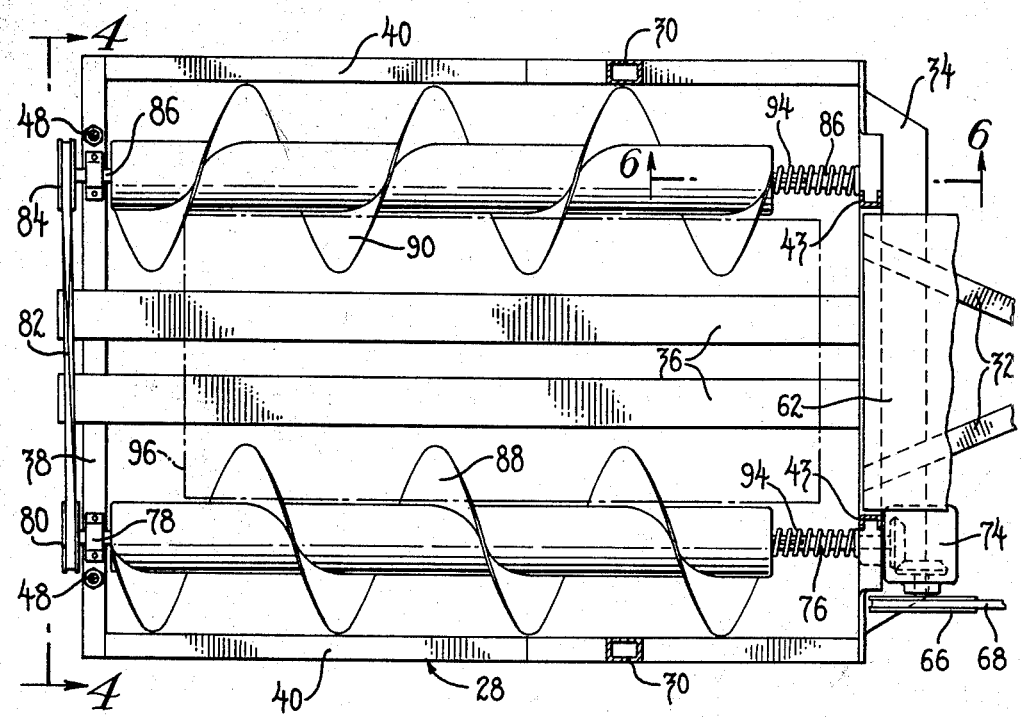
FIGURE 3 is a sectional view taken on line 3—3 of FIGURE 2.
Figure 5:
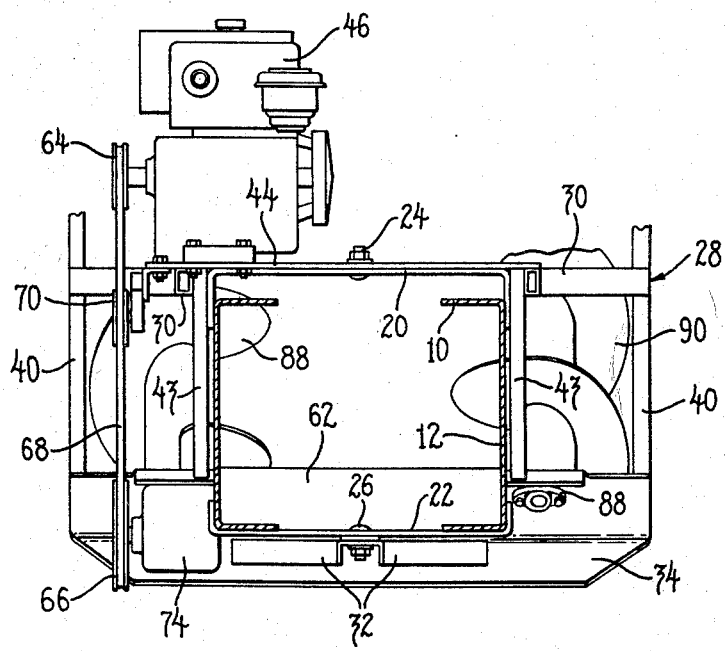
FIGURE 5 is a sectional view taken along a line 5—5 of FIGURE 2.
Figure 6:
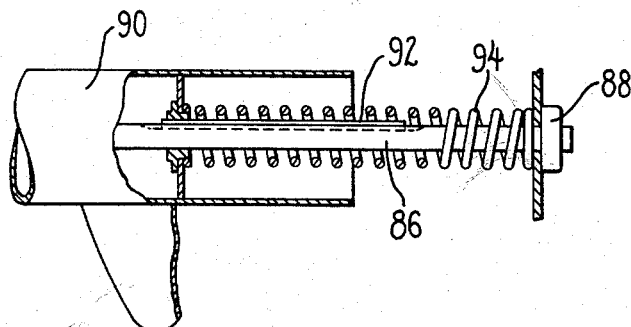
FIGURE 6 is a fragmentary sectional view taken along the line 6—6 of FIGURE 3.

Referring now to FIGURE 1 there is shown the rear end 10 of the bale case 12 of a conventional hay baler, which has a wagon hitch 14 mounted on its lower surface to which is coupled the tongue 16 of a wagon 18. The baler 12 is of any suitable form in which the bales are extruded rearwardly in small steps out of the rear opening 10 in a rearward, horizontal direction. Secured to the top and bottom of the case 12 are rearwardly extending brackets 20 and 22 which receive pivot bolts 24 and 26 (see FIG. 5) located in vertical alignment centrally of and somewhat to the rear of the opening 10. Pivoted on the bolts 24 and 26 is a bale projector generally designated 28 which has a main frame comprising top horizontal side tubes 30 and lower forwardly extending brackets 32. The latter support a transverse angle piece 34 connecting a pair of longitudinal guide and frame members 36, which are inclined upwardly and rearwardly and form the bottom of a guide path along which bales are adapted to be projected.

The rear ends of the guide bars 36 are connected by a transverse frame member 38. Both of the transverse members 34 and 38 project laterally outwardly to receive longitudinal side members 40 upon which is mounted a broad, U-shaped lower pan 42. At the forward end of the angle bar 34, upright side members 43 extend upwardly to connect with the horizontal top side tubes 30. Mounted on the latter at one side is a base plate 44 forming a support for a power source 46 which may take the form of a gasoline engine, a hydraulic motor or a bevel gear box connected to a tractor P.T.O. shaft. The plate 44 extends across between the two tubes 30 and receives the upper pivot bolt 24 mounted on the bracket 20. At the rear of the projector the cross member 38 supports a pair of upright bars 48 which receive a cross member 50 secured thereto by means of compression springs 52 and nuts 54 which normally hold the bar 50 downwardly against stop shoulders 56 formed on the uprights 48.

Connected between the cross bar 50 and the plate 44 is a longitudinal guide 58 taking the form of an inverted channel along which the upper surface of a hay bale may slide between it and the lower guides 36. Lateral guide bars 60 may be mounted at the sides of the bale path, being secured to the uprights 48 at the rear and the uprights 43 at the forward end. Thus there is provided a guide means forming a path similar to a tunnel through which a hay bale may pass to be projected upwardly and rearwardly. An arcuate transition plate 62 is secured to the upper flange of the transverse angle plate 34 and extends forwardly to a point underneath the bottom bracket 22.

The prime mover 46 has a pulley 64 which drives a lower pulley 66 by means of a belt 68 running over a tensioning idler 70 secured to the frame of the projector. The pulley 66 is on the input shaft of a bevel gear box 74 secured to the angle bar 34 and having an output shaft 76 which extends longitudinally near one lower corner of the projector frame. The shaft 76 is journaled at its rear end on a bearing 78 and carries a pulley 80 at the rear of the frame. The pulley 80 drives a cross belt 82, which drives a similar pulley 84 mounted on a corresponding shaft 86 at the opposite lower corner of the projector frame and having its forward end journaled in a bearing 88 mounted on the angle bar 34. The shafts 76 and 86 carry and drive lightweight tubular augers 88 and 90.

For the purpose of increasing the initial length of frictional engagement between the augers and an inserted bale, the augers 88 and 90 are mounted on the shafts 76 and 86 with a certain amount of lost motion, as shown by the clearance at the forward end of the augers. In the form illustrated, this lost motion is pure axial motion between the auger and the shaft, and for this purpose a longitudinal sliding without relative rotation between the auger and the shaft.

If desired this construction may be replaced with a fast pitch screw thread in place of the key 92 to allow for both rotational and axial lost motion. In either event, the lost motion is normally biased by means of a compression spring 94, for example, to shift the augers away from the entrance end of the bale guide path of the projector. The length of initial engagement may be increased in other ways, of course, either in the projector or in the baler where, for example, the normal rate of extrusion may be temporarily slowed down to build up extra endwise resilience in the bale and then released to produce a longer step of extrusion as the final step for insertion into the projector.

Figure 4:
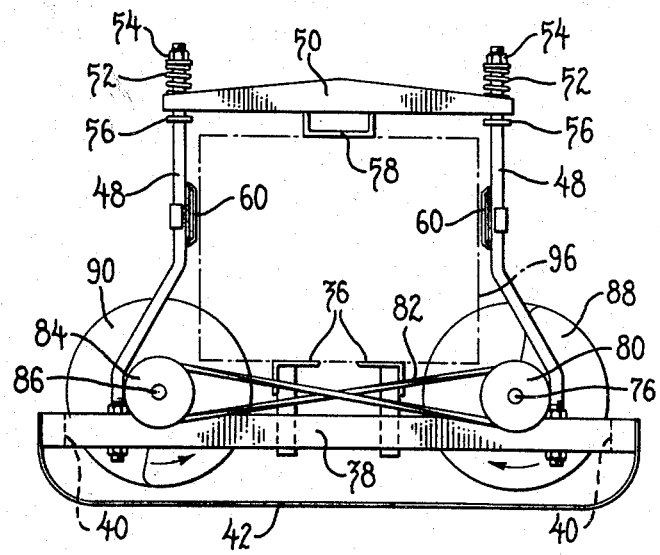
FIGURE 4 is an end view taken along plane 4—4 of FIGURE 3.

In operation, with the engine 46 running at preferably a governed speed, the belt 68 drives the gear box 74 which drives the shaft 76 in the direction of the arrow shown in FIGURE 4. The cross belt 82 drives the shaft 86 in the opposite direction. So long as there is no bale present in the entrance opening to the guide path through the projector, the spring 94 holds the augers 88 and 90 upwardly against stops (not shown on the shaft 86) and the augers rotate idly at a fixed speed. As the baling operation progresses and a bale is extruded out of the bale case 12 through the rear opening 10, the rear end of the bale is guided upwardly by the curved guide plate 62. The bale may bend a little bit in this operation. As the bale is extruded farther to the rear in small steps, the end eventually will contact the helical flights of the augers. As seen in FIGURE 4, these intersect the lower corner of the guide path of the bale, which is indicated in dot-dash lines at 96, and the auger flights will engage into the bale. The first action is an almost instantaneous threading of the augers 88 and 90 downwardly compressing the springs 94 until they close up solid, or until the auger meets any other suitable stop (not shown). This causes the auger flights to engage the lower corner of the bale along a length at least equal to the distance of compression of the spring 94.

Thus, after initial contact between the bale and the augers, the latter are immediately shifted to engage the bale along a greater length and thus provide a substantial frictional grip on the bale, whereby it can be quickly accelerated and projected upwardly and rearwardly along the path determined by the guide rails 36, 58 and 60. The speed of operation of the augers is so chosen that, having regard to the average weight of bale being handled, sufficient momentum is imparted to the bale to cause it to project through the air along a trajectory indicated by dot-dash lines in FIGURE 1 and ending in a suitable location in the wagon. Convenient governor adjusting means may be provided on the engine 46 to vary this speed to cause a longer or shorter trajectory as required by the progressive loading of the wagon 18. When the baler is being pulled around a corner, the wagon tongue 16 will pivot with respect to the baler and, in order to prevent bales from being ejected clear of the wagon, an auxiliary tongue 98 shown in FIGURE 1 is secured to the lower portion of the angle bar 34 and pivoted thereto on a horizontal transverse axis. The auxiliary tongue 98 has a fork 100 at its rear end which straddles the tongue 16 and serves to swing the entire frame of the projector so as to keep it aimed into the wagon.

I claim as my invention:

1. A projector for hay bales and the like comprising a frame, guide means extending longitudinally of the frame to direct a bale along a predetermined path from an entrance opening to a discharge opening formed in the frame, means forming a source of rotary power, bale driving means alongside said path having a driving element engageable frictionally with a side surface of the bale, power means for continuously operating the bale driving means, a shiftable mounting means for the bale driving means arranged to allow shifting of the bale driving means parallel to the path while maintaining the operation thereof by the power means, and means biasing the bale driving means parallel to said path away from the entrance whereby the first engagement of a bale with the bale driving means serves to shift the latter against said bias toward the entrance to increase the length of frictional engagement therebetween.

2. In a projector for hay bales and the like, the combination comprising a frame, guide means extending longitudinally of the frame to direct a bale along a predetermined path from an entrance opening to a discharge opening formed in the frame, means forming a source of rotary power, an auger mounted in the frame at one side of said path and having a helical flight extending slightly into the path, drive means connected between the auger and the power source and having a non-rotatable but axially slidable connection on the axis of the auger, said power source and said drive means driving said extending flight axially from said entrance at a speed sufficient to impart a throwing velocity to hay bales, and means biasing the auger axially away from the entrance whereby, upon first engagement of a bale with the auger, the auger is shifted axially to increase its length of contact with the bale.

3. A projector for hay bales or the like comprising, in combination, a frame defining an upwardly inclined guide path extending from an entrance opening to a discharge end, said frame also including a member for guiding a bale into alinement with said path and through said entrance opening, an auger journaled in said frame parallel to said guide path, said auger having a helical flight whose periphery extends into said path so as to frictionally grip, and carry upwardly along said path, bales moving through said opening, means for rotatably driving said auger at a speed causing said flight to carry bales along said path with sufficient velocity to throw the bales upwardly from said discharge end, said auger being mounted for limited axial shifting movement toward and away from said entrance opening, and means for biasing said auger axially to a normal position away from said opening with a force that is less than the force developed by the auger in carrying a bale along said path so that initial biting contact of said flight with a bale shifts the auger against said bias toward said opening thereby establishing an increased length of engagement between said flight and the bale.

References Cited in the file of this patent
UNITED STATES PATENTS

| | | |
|---|---|---|
| 1,390,338 | Cameron | Sept. 13, 1921 |
| 1,933,404 | Allen | Oct. 31, 1933 |
| 2,067,583 | Stark | Jan. 12, 1937 |
| 2,541,742 | Booth | Feb. 13, 1951 |
| 2,894,651 | Forth | July 14, 1959 |
| 3,021,620 | Rosenthal | Feb. 20, 1962 |
| 3,043,418 | Morrison | July 10, 1962 |
| 3,055,519 | Hollyday | Sept. 25, 1962 |